US010087707B2

(12) United States Patent
Rochen et al.

(10) Patent No.: US 10,087,707 B2
(45) Date of Patent: Oct. 2, 2018

(54) MOLDED COMPOSITE SLIP OF SHEET MOLDED COMPOUND FOR DOWNHOLE TOOL

(71) Applicant: Weatherford Technology Holdings, LLC, Houston, TX (US)

(72) Inventors: James A. Rochen, Waller, TX (US); Matthew R. Stage, Houston, TX (US); Jonathan A. Young, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 521 days.

(21) Appl. No.: 14/484,386

(22) Filed: Sep. 12, 2014

(65) Prior Publication Data

US 2015/0068732 A1    Mar. 12, 2015

Related U.S. Application Data

(60) Provisional application No. 61/877,136, filed on Sep. 12, 2013.

(51) Int. Cl.
| | |
|---|---|
| *E21B 23/06* | (2006.01) |
| *E21B 33/129* | (2006.01) |
| *E21B 23/01* | (2006.01) |
| *B29C 43/20* | (2006.01) |
| *B29K 101/10* | (2006.01) |
| *B29L 31/16* | (2006.01) |
| *B29C 43/50* | (2006.01) |

(52) U.S. Cl.
CPC .......... *E21B 33/129* (2013.01); *B29C 43/203* (2013.01); *E21B 23/01* (2013.01); *E21B 23/06* (2013.01); *B29C 2043/503* (2013.01); *B29K 2101/10* (2013.01); *B29L 2031/16* (2013.01); *Y10T 29/49865* (2015.01); *Y10T 29/49908* (2015.01)

(58) Field of Classification Search
CPC ........ E21B 33/129; E21B 23/06; E21B 23/01; Y10T 29/49865; Y10T 29/49908; B29C 43/503
See application file for complete search history.

(56) References Cited

U.S. PATENT DOCUMENTS

| | | | |
|---|---|---|---|
| 4,035,162 A | 7/1977 | Brothers et al. | |
| 5,074,828 A | 12/1991 | Ellis | |
| 5,484,120 A | 1/1996 | Blakeley et al. | |
| 6,624,213 B2 | 9/2003 | George et al. | |

(Continued)

OTHER PUBLICATIONS

Halliburton, "Drillable Service Tools," undated, obtained from www.halliburton.com on Sep. 12, 2014.

(Continued)

*Primary Examiner* — Jermie Cozart
(74) *Attorney, Agent, or Firm* — Blank Rome, LLP

(57) ABSTRACT

A component of a slip assembly is formed by rolling sheet molding compound into a rolled charge. The rolled charge is positioned in a compression molding press and compressed to produce a molded element. The molded element is removed from the compression molding press and can be machined for use as the component of the slip assembly. The component can be a slip segment or can be a cylindrical body for the slip segment. The compound layers in the molded component can be oriented in a number of different orientations in the component and can increase the overall strength of the component.

21 Claims, 12 Drawing Sheets

(56) References Cited

U.S. PATENT DOCUMENTS

| | | |
|---|---|---|
| 6,666,275 B2 | 12/2003 | Neal et al. |
| 6,712,153 B2 | 3/2004 | Turley et al. |
| 6,901,986 B2 | 6/2005 | Bradish |
| 6,976,534 B2 | 12/2005 | Sutton et al. |
| 7,124,831 B2 | 10/2006 | Turley et al. |
| 7,779,927 B2 | 8/2010 | Turley et al. |
| 8,047,279 B2 | 11/2011 | Barlow et al. |
| 2007/0104932 A1 | 5/2007 | Boss |
| 2008/0199642 A1 | 8/2008 | Barlow |

OTHER PUBLICATIONS

McClinton Energy Group, "Mustang Series Frac Plug," undated, obtained from http://www.mcclintonenergy.com/jaycar on Sep. 12, 2014.
Baker Hughes, "Workover Systems," copyright 2010, pp. 43-53.
Quantum Composites, "Lytex(R) 9063 BK-E," dated Jul. 11, 2013.

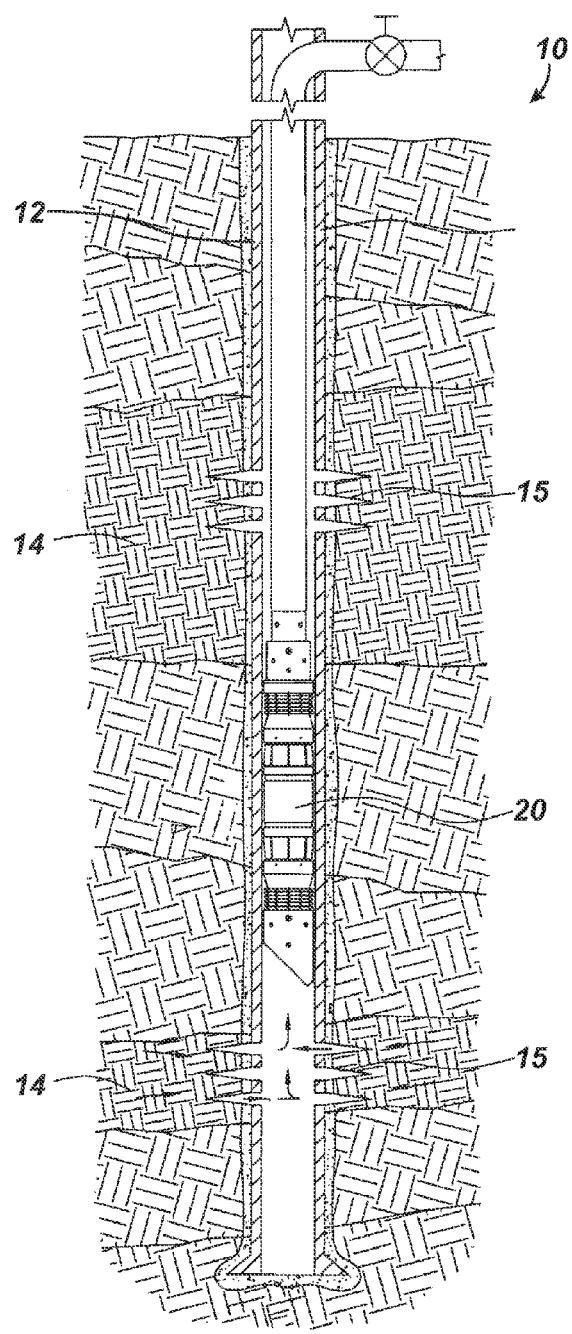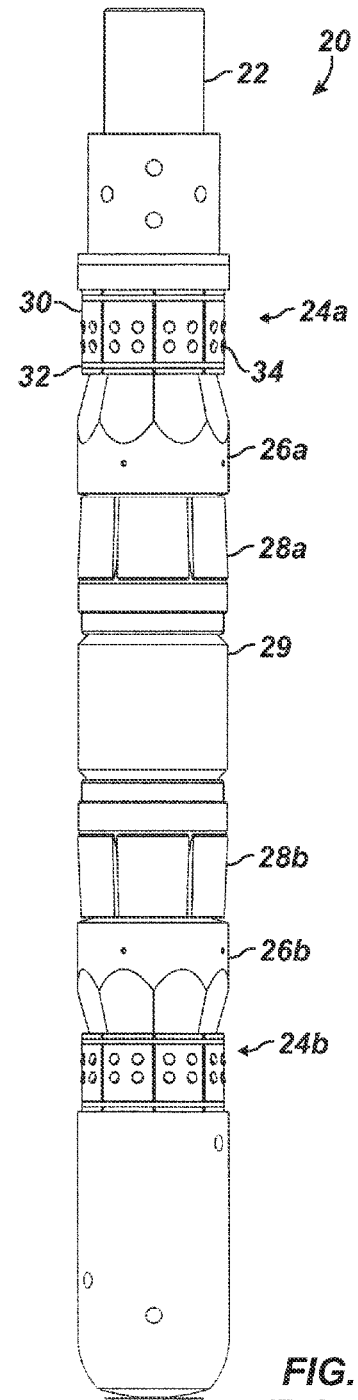
FIG. 1A
(Prior Art)
FIG. 1B
(Prior Art)

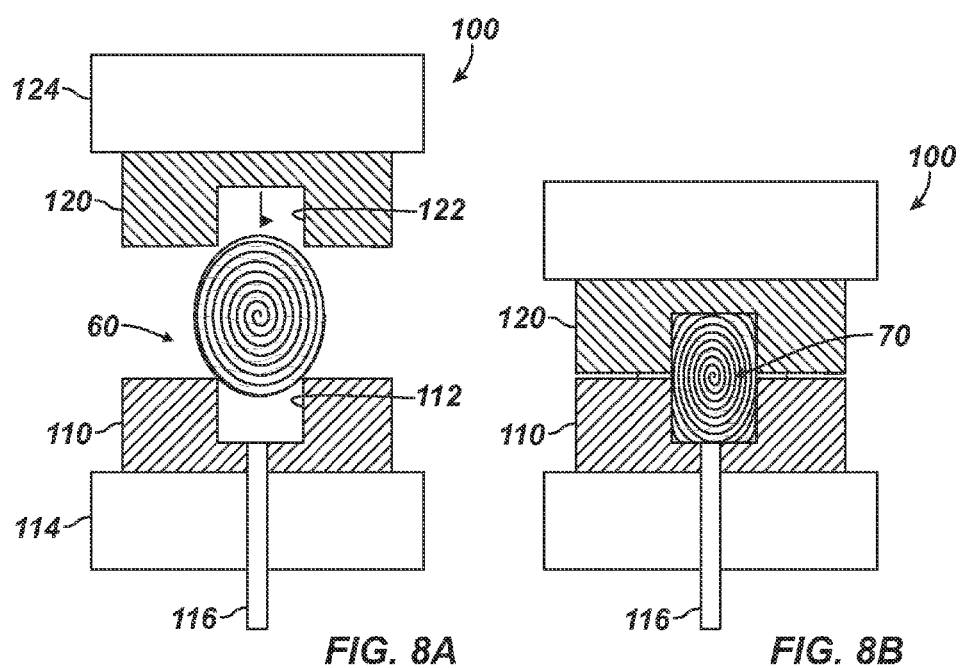
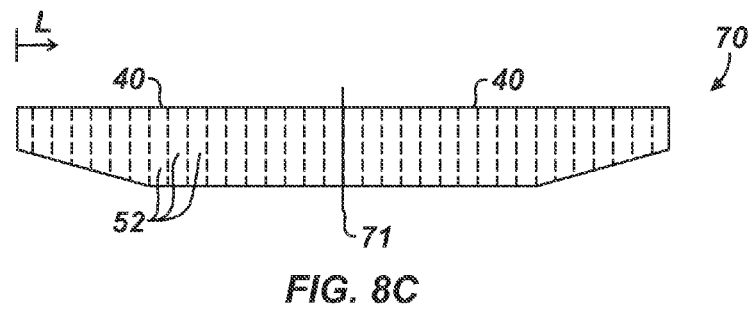
FIG. 8A   FIG. 8B
FIG. 8C

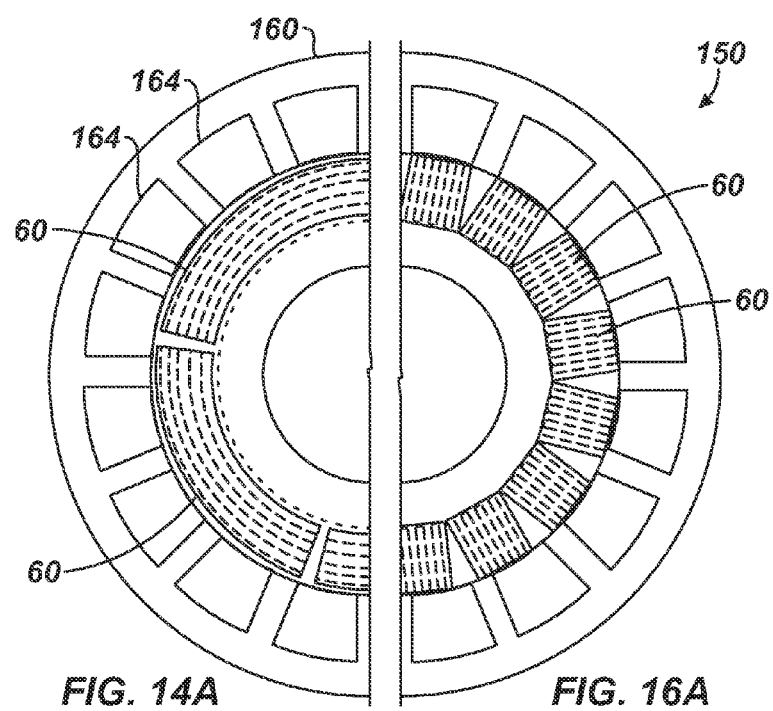
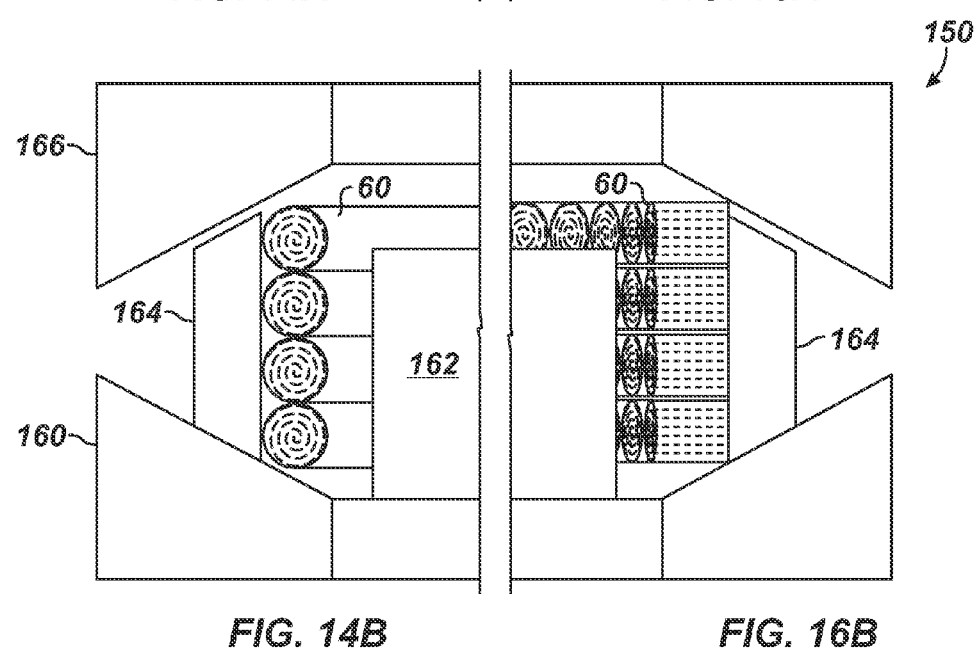
FIG. 14A  FIG. 16A
FIG. 14B  FIG. 16B

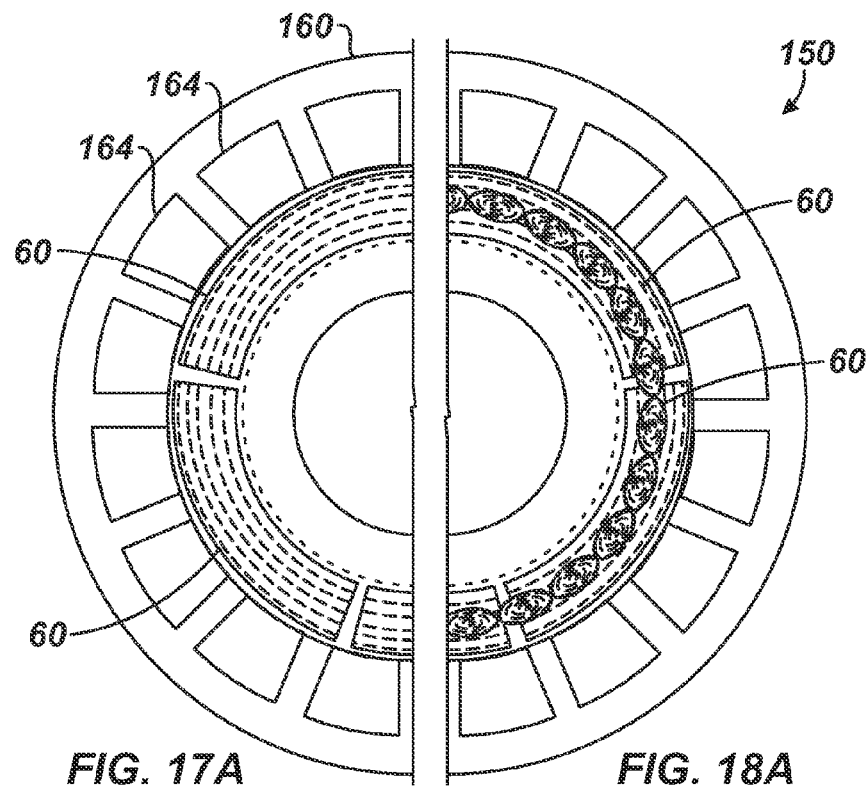
FIG. 17A    FIG. 18A
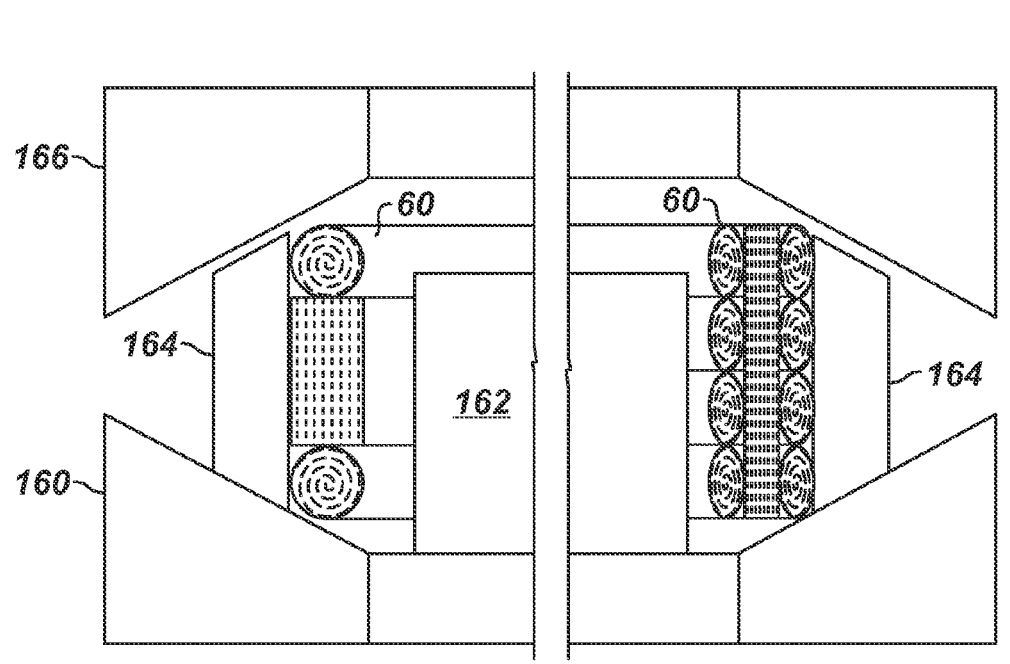
FIG. 17B    FIG. 18B

MOLDED COMPOSITE SLIP OF SHEET MOLDED COMPOUND FOR DOWNHOLE TOOL

CROSS-REFERENCE TO RELATED APPLICATIONS

This application claims the benefit of U.S. Prov. Appl. 61/877,136, filed 12 Sep. 2013, which is incorporated herein by reference.

BACKGROUND OF THE DISCLOSURE

An oil or gas well includes a bore extending into a well to some depth below the surface. The bore is lined with tubulars or casing to strengthen the walls of the bore. To further strengthen the walls of the bore, the annular area formed between the casing and the bore is typically filled with cement to permanently set the casing in the bore. The casing is then perforated to allow production fluid to enter the bore and to be retrieved at the surface of the well.

Typically, downhole tools with sealing elements are placed within the bore to isolate the production fluid or to manage production fluid flow through the well. For example, a bridge plug, a fracture plug, or a packer is placed within a bore to isolate upper and lower sections of production zones. Thus, by creating a pressure seal in the bore, these plugs allow pressurized fluids or solids to treat an isolated formation. These tools are usually constructed of cast iron, aluminum, or other alloyed metals, but have a malleable, synthetic element system. The plug or packer system can also be composed of non-metallic components made of composites, plastics, and elastomers.

Slips are a part of these downhole tools, such as plugs and packers, and the slips can also be composed of metallic or non-metallic components. However, metallic slips can cause problems during mill-up operations of the downhole tools in horizontal wells. As one solution to these problems, slip segments composed of composite material can be held on a mandrel of a downhole tool, such as a plug. These composite slip segments are typically held together with bands on the tool's mandrel until actuated to engage the surrounding casing downhole. Additionally, the composite slips segments can have inserts or buttons that are composed of metallic materials (e.g., tungsten carbide or the like) that grip the inner wall of the surrounding casing or tubular. Examples of downhole tools with slip segments with inserts are disclosed in U.S. Pat. Nos. 6,976,534 and 8,047,279.

FIG. 1A illustrates a fracturing system 10 having a composite plug 20 according to the prior art disposed in a bore. As shown, the system 10 can have at least one of the composite plugs 20 disposed within the casing 12 lining the bore.

Casing 12, as known in the art, is used to further strengthen the walls of the bore, and therefore the area formed between the casing 12 and the bore is typically filled with cement to permanently set the casing 12 within the bore. Also as shown, the casing 12 is perforated to allow production fluid to enter the casing 12 so the produced fluids can be retrieved at the surface of the well. The perforations 15 in the casing 12 are formed in formation zones 14 as shown. The formation zones 14 indicate zones where production fluid potentially exists. Accordingly, the casing 12 at these zones 14 is perforated in order to allow fluid to flow into the casing 12 and eventually to the surface.

FIG. 1B illustrates the composite plug 20 of the prior art in more detail. As shown, the plug 20 has a mandrel 22. As known in the art, the mandrel 22 is designed with a cylindrical hole (i.e., bore) through the center to allow for pressure equalization and well flow back prior to milling up the plug 20 after its use downhole. Also as shown, the plug 20 has uphole and downhole slip assemblies 24*a-b*, each having slip segments 30, inserts 34, and bands 32. The plug 20 also has uphole and downhole cones 26*a-b*, backups 28*a-b*, and a packing element 29.

Conventional composite slip assemblies 24*a-b* include multiple slip segments 30 disposed around the mandrel 22. Further, bands 32 typically hold the slip segments 30 in place, and the composite slip segments 30 include one or more metallic inserts 34 in order to engage the casing (12). During operation, the slip segments 30 move away from the mandrel 22 and compress the inserts 34 against the surrounding casing (12) when the plug 20 is compressed. Examples of the operation of conventional slip components of such a plug 20 are disclosed in U.S. Pat. No. 7,124,831, which is incorporated herein by reference in its entirety.

One method for forming composite slip segments 30 uses sheet molding compound (SMC). As is known, the sheet molding compound includes discontinuous fibers (e.g., glass filaments) impregnated with a composite matrix (e.g., resin). The composite matrix can include thermosetting resin, fillers, and additives such as initiators, inhibitors, thickeners, mold release agents, and the like.

The sheet molding compound is formed by forming the matrix as a paste layer onto conveyed carrier film. A doctor box (also known as a paste reservoir) places resin paste onto the carrier film (typically composed of plastic). Afterward, discontinuous fibers are distributed onto the paste layer as a mat of fibers. For example, the carrier film with the past layer passes under a chopper that releases strands of glass fiber. Long strands (more than 1") of chopped glass fibers are released onto the layer of resin.

Another layer of resin is applied to hold all the fibers together, and another carrier film is added on the top layer. Subsequently, the sandwich layers are calendered to compact, impregnate, and wet the fiber bed by the paste to form a compounded sheet, which can then be matured to a malleable state.

The sheet molding compound can be made into larger composite parts using compression molding. When the sheet molding compound has matured enough for molding, for example, the compounded sheet is cut into pieces or charges, and the carrier films are removed. The pieces are then stacked together and put in a mold mounted on a steel die in a hydraulic or mechanical press, which is heated and applies pressure to the stacked charge to form the component.

This conventional molding method used to mold the composite slip segment 30 orients the fibers in parallel layers. According, such a molding process may enable the composite slip segment 30 to have a higher compressive strength, but the slip segment may have a low shear or tensile strength due to the orientation of the fibers.

Another method for forming composite slip segments 30 that uses sheet molding compound (SMC) is disclosed in U.S. Pub. 2008/0199642 to Barlow. A strip of sheet molding compound is wrapped into a seven layer roll, is placed in the mold with the axis of the roll along the length of the mold, and is compression molded at about 4000-psi pressure at a temperature of about 300-310 degrees Fahrenheit for twelve minutes. The mold is overcharged with the sheet molding compound so that a portion of the charge is squeezed out of the mold between the two pieces of the mold. When the slip body is removed from the mold, only grinding off of flashing is needed at the parting line. Granular abrasive is used on the slip body for gripping an internal surface of a tubular.

Of course, cast iron or other metallic slip assemblies 24a-b can be used in applications with increased loads, higher pressures, and higher temperatures. Such metallic slips assemblies 24a-b provide a higher overall strength for high pressure and temperature environments. However, at least one problem associated with such metallic slip assemblies 24a-b is that it is often less desirable to use such metallic components due to the time required to mill the components.

That is, plugs 20 are sometimes intended to be temporary and must be removed to access the casing (12). Rather than de-actuating the plug 20 and bringing it to the surface of the well, the plug 20 is typically destroyed with a rotating milling or drilling device. As the mill contacts the plug 20, the plug 20 is "drilled up" or reduced to small pieces that are either washed out of the bore or simply left at the bottom of the bore. Consequently, the more metal parts making up the plug 20, the longer the milling operation takes, and more damage to the milling equipment may result. Although, alternative solutions like fabric wrap resin infusion have also been used to remedy the mechanical properties of composite slips, this method has pressure and or temperature limitations that render it less suitable for some operations.

Accordingly, there is a need for non-metallic slip 24a-b components that will effectively have a high strength in all directions, not just have a high strength in one direction and a lower strength in another. The subject matter of the present disclosure is directed to overcoming, or at least reducing the effects of, one or more of the problems set forth above.

SUMMARY OF THE DISCLOSURE

Conventional molding methods used to mold a composite slip create a fiber orientation susceptible to shear stress. This can cause the part to have high compressive strength in direction, but lower shear strength. A jelly roll or other multidimensional charge pattern creates a spiral fiber orientation in the finished slip segments, which leads to an optimization of the mechanical properties (compression, tension, and shear). These properties are all critical in the design and qualification of a composite slip. The jelly roll pattern is formed by taking a sheet of the raw material and rolling it into a spiral shape and then placing it into the mold. Utilizing such jelly roll or other multidimensional charge patterns has proven successful in optimizing composite molded slip properties.

The foregoing summary is not intended to summarize each potential embodiment or every aspect of the present disclosure.

BRIEF DESCRIPTION OF THE DRAWINGS

FIG. 1A illustrates a composite plug disposed in a wellbore according to the prior art.

FIG. 1B illustrates the composite plug of the prior art.

FIGS. 8A-8B conceptually illustrate compression molding of a slip component with the charge arranged laterally.

FIG. 8C illustrates a side view of the slip component formed by the compression molding of FIGS. 8A-8B.

FIGS. 14A-14B conceptually illustrate plan and side views of an initial compression molding stage of the cylindrical slip components of FIG. 13A-13B.

FIGS. 16A-16B conceptually illustrate plan and side views of an initial compression molding stage of the cylindrical slip components of FIG. 15A-15B.

FIGS. 17A-17B conceptually illustrate plan and side views of an initial compression molding stage of a cylindrical slip component having a combination of stacked charges.

FIGS. 18A-18B conceptually illustrate plan and side views of an initial compression molding stage of a cylindrical slip component having a combination of layered charges.

DETAILED DESCRIPTION OF THE DISCLOSURE

Figure 2A:
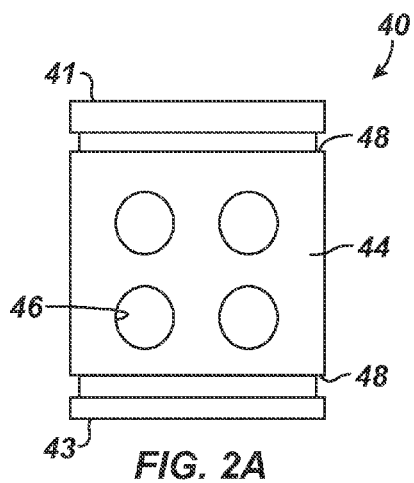
FIGS. 2A-2C illustrate front, end, and cross-sectional views of a slip segment according to the present disclosure.
Figure 2B:
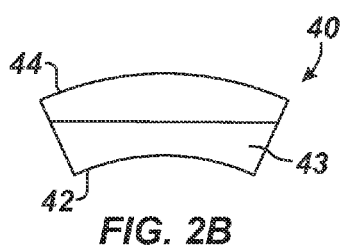
Figure 2C:
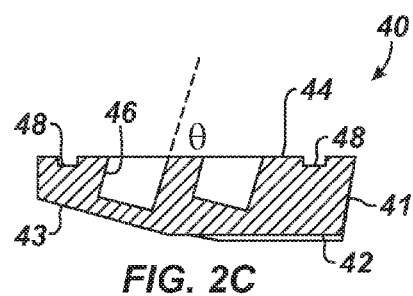

FIGS. 2A-2C illustrate front, end, and cross-sectional views of a slip segment 40 according to the present disclosure. The overall geometry, shape, features, and the like of the slip segment 40 may be similar to those used in the prior art, such as the slip segments 30 of FIG. 1B. Therefore, as shown in FIG. 2A, the slip segment 40 has a body 41 as well as an outer surface 44. Furthermore, the slip segment 40 may comprise insert holes 46 within the body 41 of the slip segment 40. The insert holes 46 may receive inserts (34) or buttons that are composed of metallic materials (e.g., tungsten carbide or the like) that serve to grip the inner wall of the surrounding casing or tubular. Also, the slip segment 40 has upper and lower slots 48. The slots 48 are provided to allow restraining bands to hold the slip segments 40 against the mandrel (22) of the plug (20), thereby keeping the segments 40 against the mandrel (22) during deployment of the plug (20) in the casing (12) until the plug (20) is activated.

The slip segment 40 also has a ramp 43 on the inner surface (42) of the slip segment 40, which serves the purpose of easing the transition of the slip segment 40 over the cones (i.e., the ramp 43 allows the slip segment 40 to be more easily transitioned over the outer surface of cones (26a-b) on the plug (20) as in FIG. 1B).

As further shown in the end view of FIG. 2B, the slip segment 40 has an inner surface 42 which also has a cylindrical curvature as the outer surface 44. Also, the ramp 43 of the segment 40 can be seen at the end of the slip segment 40.

FIG. 2C shows a cross-sectional view of the slip segment 40. As shown, the insert holes 46 are disposed within the slip segment 40 from the boundary of the outer surface 44 and protruding some depth within the segment 40. As described above, the insert holes 46 may have inserts or buttons (not shown) disposed within them. Also, although it is shown that the insert holes extend to a particular depth in FIG. 2C, the depth and or width of the insert holes 46 may extend to any depth within the segment 40.

Furthermore, as shown, the insert holes 46 may not be disposed completely perpendicular to the outer surface of the slip segment 40, and may be disposed within the slip segment 40 at an angle θ. The purpose of disposing inserts 46 at an angle θ is so that when the plug (20) is activated and the slip segment 40 is expanded outward contacting the casing (12) of the bore, the inserts 34 (within the slip segment 40) will engage the casing (12) at an angle to ensure maximum stability of the plug 20 as it is sealed within the casing (12).

FIG. 2C further shows the slip segment body 41, the inner surface 42 of the slip segment 40, and the ramp 43 of the slip segment 40. Further, the upper and lower slots 48 can be seen disposed within the outer surface 44 of the slip segment 40 for use with restraining bands (not shown).

Although the slip segments 40 can have a conventional geometry, shape, and features known in the art, the slip segment 40 is formed with a different molding process that enhances the overall strength of the segment 40 (and that in particular increases the shear strength of the segment 40). In general, the slip segment 40 is composed of sheet molding compound formed into a roll and compression molded to form the desired shape and produce the segment 40 with increased strength as disclosed herein.

Figure 3A:
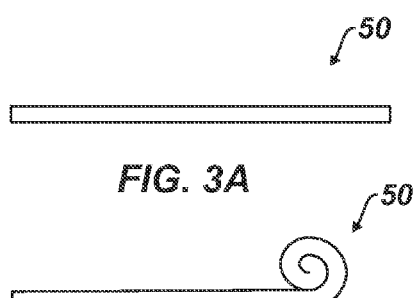
FIGS. 3A-3D conceptually illustrate a charge formed from sheet molded compound for compression molding into the disclosed slip segment.

Turning now to FIGS. 3A to 7C, details of the composition and molding process for the slip segment 40 are discussed. Referring first to FIG. 3A, a side view of a sheet 50 of molding compound is shown, which is used for forming the disclosed segment 40. The sheet 50 can be sheet molding compound (SMC), sheet molding composite, and the like, which are thermosetting products reinforced with glass fiber and produced in uncured sheets. Glass mat thermoplastics may also be used as the sheet 50. Each of these (or a combination thereof) may be used as the disclose sheet 50 for forming the disclosed segment (40). For the purposes of discussion, the sheet 50 is described herein as being sheet molding compound, but any comparable material can be used as will be appreciated by one skilled in the art with the benefit of the present disclosure. As noted above, the sheet molding compound 50 includes discontinuous fibers (e.g., glass filaments) impregnated with a composite matrix (e.g., resin). The composite matrix can include thermosetting resin, fillers, and additives such as initiators, inhibitors, thickeners, mold release agents, and the like.

Figure 3B:
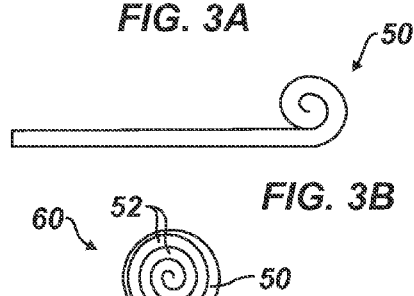
Figure 3C:
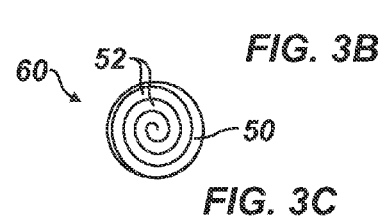
Figure 3D:
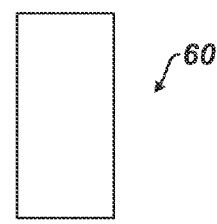

Rather than forming the disclosed segment 40 with stacked layers of sheet molding compound as in the prior art, the disclosed segment 40 is formed using a "jelly roll" formation of the sheet molding component 50. FIG. 3B shows a sheet molding component 50 being rolled in the "jelly roll" formation in accordance with the present disclosure. The sheet molding component 50 is rolled in this process before the compound is cut into a charge for the mold and the final component's shape. As shown in FIG. 3C, the charge may be rolled into the jelly roll pattern, having compound layers 52 that make up the layers of the roll from the layers of the sheet molding component 50. FIG. 3D shows a top view of the jelly roll after it has been rolled from the sheet molding component 50. In contrast to the side view represented by FIG. 3C, the compound layers 52 in the top view of FIG. 3D cannot be seen.

The rolled sheet molded component 50 forms a cylindrical charge 60 with compound layers 52 spiraling therein in in the jelly roll configuration. The disclosed slip segment (40) is formed by compression molding this charge 60, which may be first cut based on the mold and final component's shape and then compression molded as disclosed in more detail later. When used to form the slip segment (40), the charge 60 can be oriented in different ways relative to the desired final shape of the slip segment (40) to be produced.

Figure 4A:
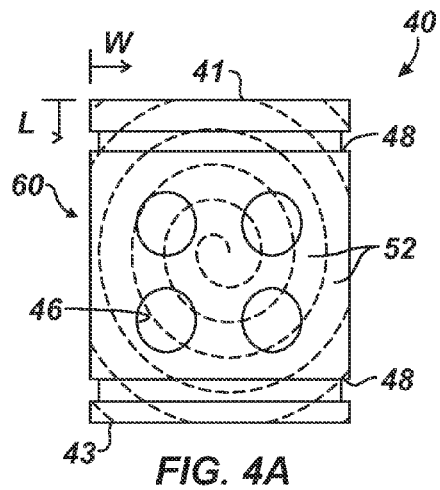
FIGS. 4A-4C illustrate front, end, and cross-sectional views of a slip component formed with the charge in one arrangement according to the present disclosure.
Figure 4B:
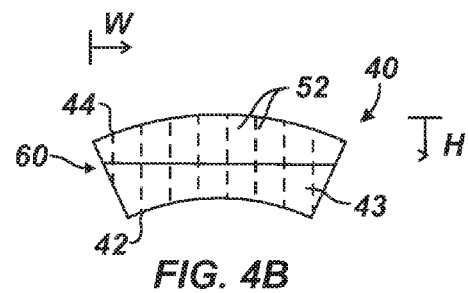
Figure 4C:
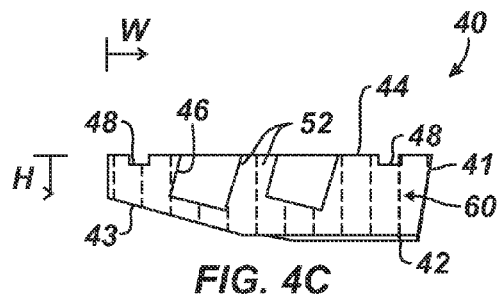

For example, FIGS. 4A-4C illustrate front, end, and cross-sectional views of a slip segment 40 formed with a charge in one arrangement according to the present disclosure. In this arrangement, the rolled charge is oriented relative to the height of the segment 40. In FIG. 4A, for instance, the front outer surface 44 of the slip segment 40 shows the orientation of the jelly roll within the finished segment 40. As shown conceptually in dashed lines, the compound layers 52 of the rolled charge 60 are arranged in a spiral formation on the segment's outer surface 44. Moreover, even though the compound layers 52 can be seen in FIG. 4A, they may or may not be visible from the outer surface of the slip segment. Also, FIG. 4A shows the insert holes 46 disposed throughout the slip segment 40, which can be molded in the outer surface 44 and/or machined in the outer surface 44. Furthermore, the insert holes 46 may be disposed in different configurations and in different pluralities in the slip segment 40.

FIG. 4B shows an end view of the slip segment 40 of FIG. 4A. In this view, the compound layers 52 can be conceptually seen relatively perpendicular to the width W of the slip segment 40 (i.e., being oriented along a height H of the slip segment 40). As will be appreciated, the orientation of the compound layers 52 is a result of how the charge 60 is placed during molding. For this configuration and as seen in FIG. 4A, the charge 60 in jelly roll configuration is compressed with the spiral of the roll face up.

Although this will be described in detail later, the result of compressing the jelly roll face up is that the compound layers 52 of the slip segment 40 will be perpendicular to the width W of the segment 40 when the reference view is an end view. Accordingly, as shown FIG. 4B, the compound layers 52 extend from the outer surface 44 of the slip segment 40 at the top of the segment 40 to the inner surface 42 at the bottom.

Referring to FIG. 4C, of the slip segment 40 of FIG. 4A is shown in a cross-sectional view. In this view, the compound layers 52 can be seen relatively perpendicular to the length L of the slip segment 40 (i.e., being oriented along the height H of the slip segment 40). As noted above for this configuration, the roll of the charge 60 is compressed with the spiral of the roll face up. The result of compressing the charge 60 with the roll face up is, like in the end view, the compound layers 52 of the slip segment 40 will be perpendicular to the length L of the slip segment 40 as well.

As described above, conventional molding methods used to mold a composite slip create a fiber orientation typically in stacked layers. This is notably different than what is presently disclosed with reference to the rolled charge (or any other multidimensional fiber charge orientation) of sheet molding compound of the present disclosure.

The 'jelly roll' pattern of the charge 60 creates a spiral fiber orientation in the finished slip segment 40, which leads to an optimization of the mechanical properties (compression, tension, and shear) of the slip segments 40. These properties are all useful in the design and qualification of a composite slip for a plug or other downhole tool.

Figure 5A:
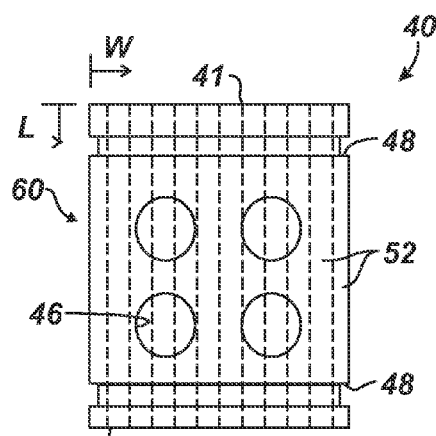
FIGS. 5A-5C illustrate front, end, and cross-sectional views of a slip component formed with the charge in another arrangement according to the present disclosure.
Figure 5B:
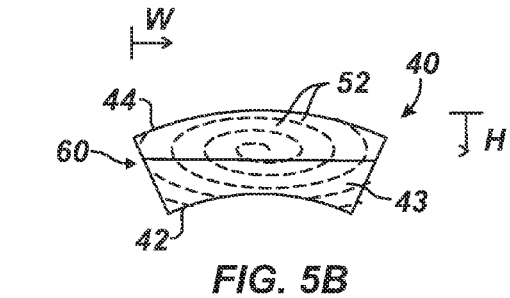
Figure 5C:
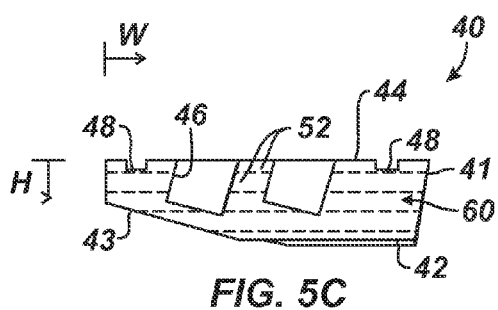

Referring now to FIGS. 5A-C, front, end, and cross-sectional views show a slip segment 40 formed with the charge 60 in another arrangement according to the present disclosure. In this arrangement, the rolled charge 60 is oriented relative to the length of the segment 40. FIG. 5A shows a front view of the slip segment 40. As conceptually indicated by the orientation of the compound layers 52, the slip segment 40 was created with the jelly roll pattern of the charge 60 being on its side. Although the process of molding the charge patterns will be described in detail later, the compound layers 52 can be seen here as lying relatively perpendicular to the width W of the slip segment 40 (i.e., being oriented along a length L of the slip segment 40).

In FIG. 5B, this end view of the slip segment 40 conceptually shows the compound layers 52 being a compressed spiral. This is a result of the jelly roll pattern of the charge 60 being compressed on its side in the molding process. Although FIG. 5A shows one orientation of the jelly roll pattern of the charge 60 extending along the length of the segment 40 from one end of the body 41 to the other, the charge pattern can be compressed in any orientation (e.g., face up as in FIGS. 4A-4C, laterally rather than longitudinally as in FIGS. 5A-5C, or at some other reference angle). For example, the layers 52 of the charge 60 can be oriented laterally across the slip segment 40 (i.e., along the width W of the slip segment 40).

FIG. 5C shows the slip segment 40 in cross-section, conceptually showing the orientation of the compound layers 52 of the jelly rolled charge 60. In this view, the compound lines can be seen relatively parallel to the length L of the slip component.

Figure 6A:
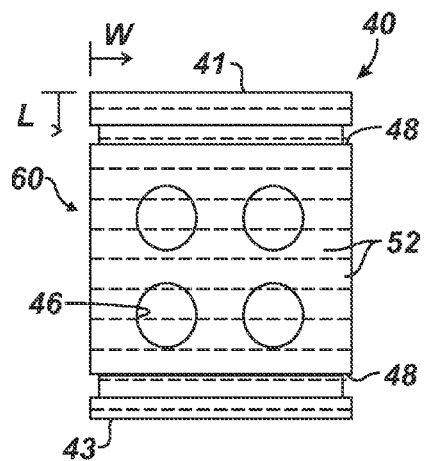
FIGS. 6A-6C illustrate front, end, and cross-sectional views of a slip component formed with the charge in yet another arrangement according to the present disclosure.
Figure 6B:
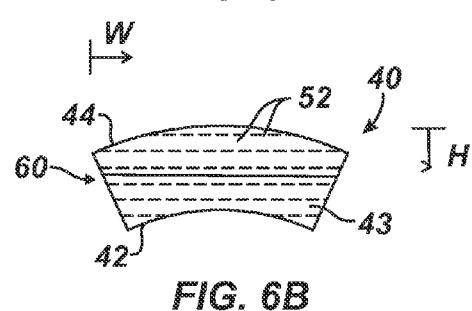
Figure 6C:
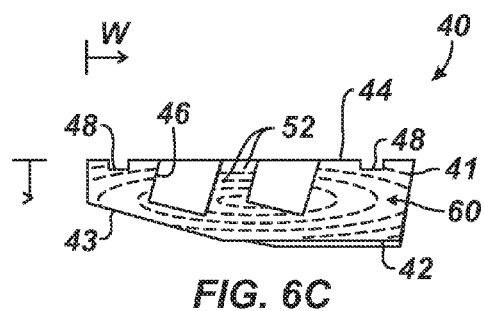

FIGS. 6A-6C shows front, end, and cross-sectional views of a slip segment 40 formed with the charge 60. In this arrangement, the rolled charge 60 is oriented relative to the width of the segment 40.

Figure 7A:
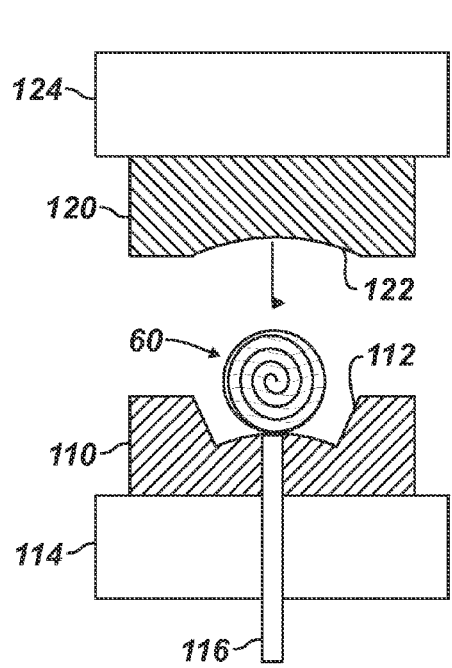
FIGS. 7A-7B conceptually illustrate compression molding of a slip component with the charge arranged longitudinally.
Figure 7B:
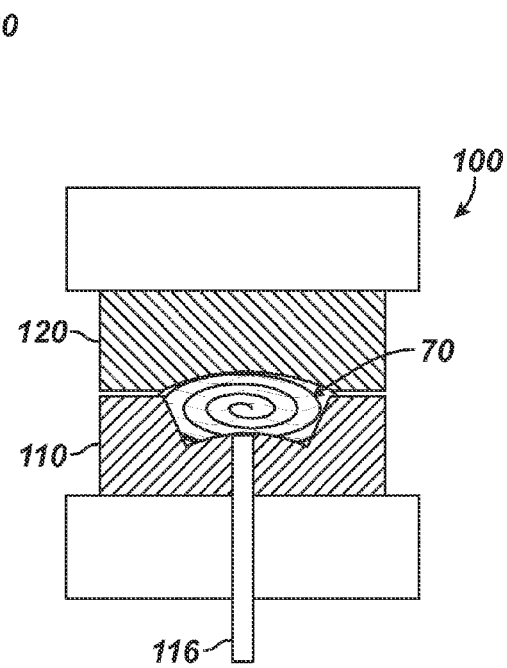

As disclosed above with reference to FIGS. 5A-5C, the rolled charge 60 can be compression molded in a side orientation to form the disclosed slip segment 40 with the compound layers 52 running longitudinally along the length of the segment. FIGS. 7A-7B conceptually illustrate the compression molding processes for forming a slip segment 40 with the charge 60 arranged longitudinally. FIG. 7A shows the compression molding process having the jelly roll charge 60 charge set in the compression molding press 100. As shown, the jelly roll charge 60 is placed in the press 100 on its side, having the spiral of the roll 60 facing out. The press 100 may be comprised of a movable platen 124 and a movable mold half 120. The movable platen 124 and the movable mold half 120 are typically attached to each other, wherein when activated the movable platen 124 will compress the movable mold half 120 to compress and mold the charge 60 placed in the mold press 100.

Furthermore, the mold press 100 has a fixed platen 114 and a fixed mold half 110. In operation, the fixed platen 114 and fixed mold half 110 are attached to each other and are held in a fixed position while the movable platen 124 compresses the movable mold half 120 to compress and mold the charge 60. The molding press 100 also may comprise an ejector pin 116, which may be used after the molding process has completed to eject the finished molded product (e.g., slip segment 40).

FIG. 7B illustrates the process 100 having been activated, compressing the jelly roll charge 60 into a produced molded component 70. As illustrated, the press 100 has compressed the movable mold half 120 in the direction of the fixed mold half 110, thereby compressing the jelly roll charge 60 into the produced molded component 70. As described below, the molding process for forming the molded component 70 uses a number of different stages of heating, compression molding, and curing for different time periods and at different temperatures. As one skilled in the art will appreciate, the parameters involved in the process can depend on the particular raw materials used, the size of the molded component, the desired characteristics of the final component, and other details.

Figure 7C:
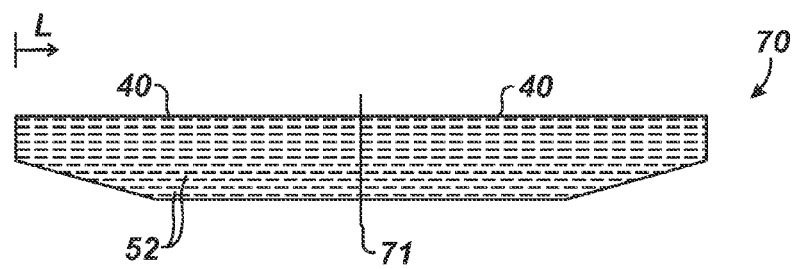
FIG. 7C illustrates a side view of the slip component formed by the compression molding of FIGS. 7A-7B.

In FIG. 7C, the molded component 70 is seen in more detail in a side view. In one example, the slip element 70 may be molded to produce one element, which can later be machined into one or more slip segments 40. In this example, the compound layers 52 can be conceptually seen running parallel to the length L of the molded component 70. Again, the orientation of the compound layers 52 are a result of the orientation of the jelly roll charge 60 as it is molded. Referring to the molded component 70 in FIG. 7C, the slip element may be divided into two or more slip segments 40 by cutting the molded component 70 along the center line 71. Moreover, although only one mold structure and one orientation of the jelly roll charge 60 are shown, there may be many different molds and different orientations of the jelly roll charge 60.

The molding process for forming the molded component 70 and segments 40 uses a number of different stages of heating, compression molding, and curing for different time periods and at different temperatures. As one skilled in the art will appreciate, the parameters involved in the process can depend on the particular raw materials used, the size of the molded component, the desired characteristics of the final component, and other details.

In general, the process begins by operators pre-weighing a required amount of sheet molding compound for the slip component (e.g., the produced component 70). Operators then cut the charge 60 of the molding compound with an appropriate pattern based on the mold and the final component's shape. The shape of the component required determines the shape of the charge 60. The charge 60 may usually cover 30-70% of the mold surface because the charge 60 is expected to flow during molding as the charge 60 is pressed or stamped. The press 100 can be a heated mold, and/or the charge 60 may be preheated depending on the materials and processes involved.

In one example, operators may heat the molding compound (i.e., the charge 60) at a pre-stage temperature (e.g., 200° F.) for an extended period (e.g., 16 hours). When the pre-staged material is ready for molding, operators then preheat the press 100 to the pre-stage temperature (e.g., 200° F.) for a period of time (e.g., 5 minutes). The pre-staged charge 60 is then placed in the pre-heated press 100, and the mold temperature is elevated to a cure temperature (e.g., 265° F.) for a cure cycle at a pressure (e.g., 1000 PSI). This cure cycle may last for about 15 minutes to an hour depending on the material, mass, shape, etc.

After the cure cycle, a post cure is applied at an elevated temperature (e.g., 700° F.) for a post cure period (e.g., 2-hours). During the molding, flow and heat transfer occurs in the compound as accompanied by the orientation of the fiber reinforcement. During solidification, and while under pressure, the resin cures and forms cross-links.

Finally, the molded component 70 is allowed to cool to a safe handling temperature so the component 70 can be removed from the press 100 and machined as necessary. For example, the press 100 is opened so the molded component 70 can be removed and can be finished with machining, coating, and other operational steps. The post-molded steps can involve cutting the component 70 into the segments 40, preparing the surfaces, forming any holes, slits and the like, and applying a surface coating, among other possible steps. Some features of the component 70 may be produced in the mold, such as certain inclines, holes, and the like, so that machining these features would not be necessary after molding.

As disclosed above with reference to FIGS. 4A-4C, the rolled charge 60 can be compression molded in an end orientation to form the disclosed slip segment 40 with the compound layers 52 running perpendicular to the length of the segment 40. FIGS. 8A-8B conceptually illustrate compression molding of a slip component 70 with the charge 60 arranged perpendicular to the length. FIG. 8A shows the process having a jelly roll charge 60 set in the press 100. As shown, the jelly roll charge 60 is placed in the press 100 with the spiral of the roll facing out. In this example, the rolled charge 60 may be a thin disc arranged to be compressed into a rectangular shape for the slip component 70. Alternatively, the rolled charge 60 may be a long cylinder arranged to be compressed into a rectangular shape, which is then cut laterally to form the flat shape of the slip component 70.

As described above, the press 100 may be comprised of a movable platen 124 and a movable mold half 120 and a fixed platen 114 and a fixed mold half 110.

FIG. 8B illustrates the press 100 having been activated, compressing the jelly roll charge 60. As illustrated, the press 100 has compressed the movable mold half 120 in the direction of the fixed mold half 110 thereby compressing the rolled charge 60 into a slip component 70. As described above, the molding process for forming the slip component 70 uses a number of different stages of heating, compression molding, and curing for different time periods and at different temperatures. As one skilled in the art will appreciate, the parameters involved in the process can depend on the particular raw materials used, the size of the molded component, the desired characteristics of the final component, and other details.

In FIG. 8C, the slip component 70 is seen in more detail in a side view. In one example, the slip component 70 may be molded to produce one element and can be later machined into one or more slip segments 40. In this example, the compound layers 52 can be seen perpendicular to the length L of the slip component 70. Again, the orientation of the compound layers 52 are a result of the orientation of the rolled charge 60 before it is molded. Referring to the slip component 70 in FIG. 8C, the slip component 70 may be divided into two or more slip segments 40 by cutting the mold along the center line 71.

Figure 9A:
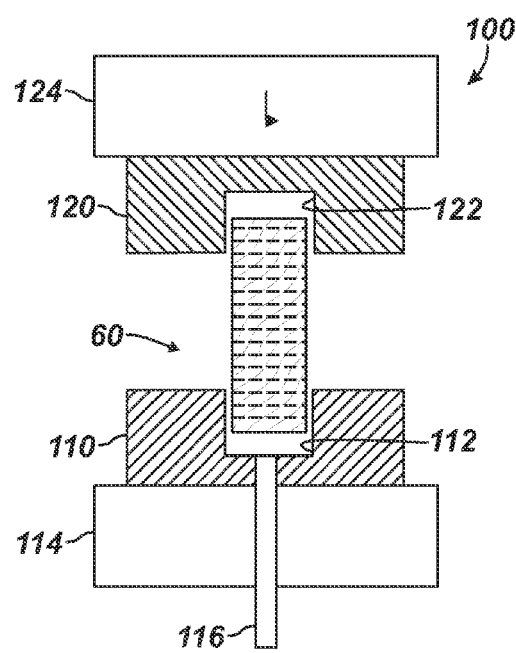
FIG. 9A conceptually illustrates compression molding of a slip component with the charge arranged along the width.
Figure 9B:
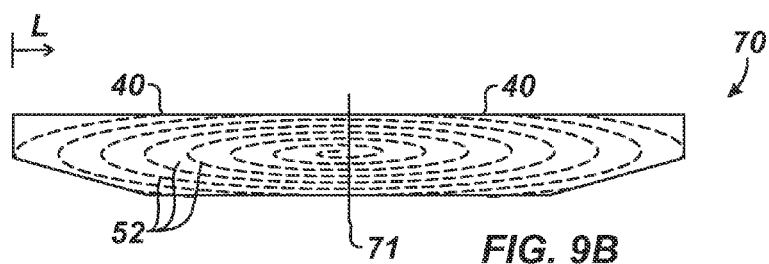
FIG. 9B illustrates a side view of the slip component formed by the compression molding of FIG. 9A.

As disclosed above with reference to FIGS. 6A-6C, the rolled charge 60 can be compression molded in a width orientation to form the disclosed slip segment 40 with the compound layers 52 running along the width of the segment 40. Compression molding a slip component 70 as in FIGS. 9A-9B with the charge 60 arranged along the width can be performed in a similar manner to the technique disclosed above with reference to FIGS. 7A-7C, except that the charge 60 is arranged along the width.

Figure 10A:
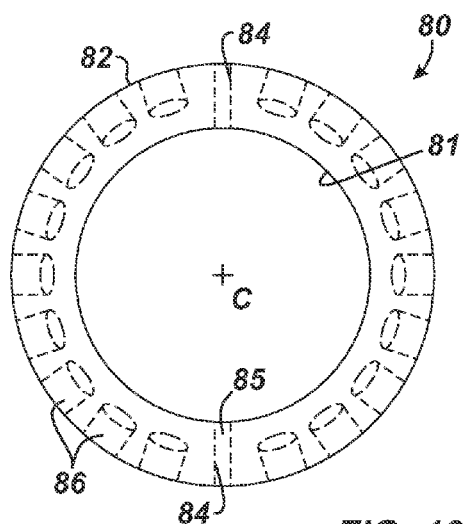
FIG. 10A illustrates an end view of a cylindrical slip component according to the present disclosure.
Figure 10B:
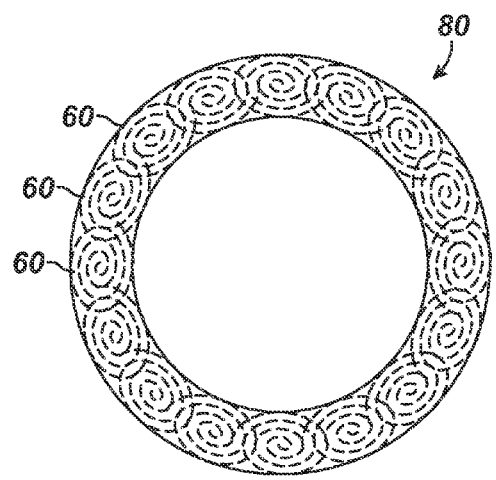
FIG. 10B conceptually illustrates the interior arrangement of the cylindrical slip component of FIG. 10A.
Figure 10C:
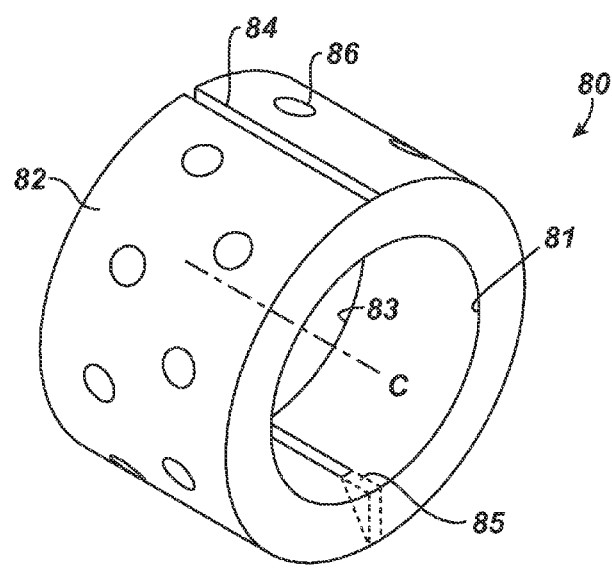
FIG. 10C illustrates a perspective view of the slip component of FIG. 10A.

Previous embodiments have produced slip segments 40 for use together with one another in slip assemblies. As an alternative, the teachings of the present disclosure can be used to form larger slip components for slip assemblies. In particular, FIGS. 10A-10C illustrate a slip component 80 according to the present disclosure. As shown, the slip component 80 is different from the slip segment 40. For example, the slip component 80 may be comprised of a single cylindrical component with one or more slits 84 and insert holes 86 machined in it, whereas the previously disclosed slip segment 40 may be only one segment of a plurality of segments 40 to be held together with bands to form a slip assembly. Preferably, the slip component 80 forms a cylindrical body or ring that is primarily continuous except for one or more slits 84.

Here, only two slits 84 are formed at opposite sides of the cylindrical body. The slits 84 preferably extend partially from a first end of the body toward the second end. The outer portion of the slits 84 can extend a greater length along the outer surface 82 than the inner portion of the slit 84 extending along the inner surface 81. This can create hinged interconnections 85 at the second end of the body for the slits 84. These hinged interconnections 85 can be triangular in cross-section.

FIG. 10A shows that the slip component 80 has an inner surface 81 and an outer surface 82, each having a cylindrical form. As also shown in FIG. 10A, the slip component 80 has a plurality of insert holes 86 which may be disposed in the body of the component 80.

Such a cylindrical shape for a slip component can be formed by using a continuous fiber winding method. For example, a fiber, such as e-glass, carbon glass, etc., can be wet wound in a continuous winding process where the fibers are wound around a temporary mandrel to form the cylindrical shape. However, if formed exclusively with such a winding process, the cylindrical shape can have poor tensile strength because the fiber is wound in layers on the component.

To improve the shear strength of the slip component 80, the cylindrical body of the component 80 is formed at least partially using rolled charges of sheet molding compound as disclosed herein. How the rolled charges 60 are used in the formation of the slip component 80 may be better understood by referring to FIG. 10B. In particular, FIG. 10B conceptually illustrates the interior arrangement of the slip component 80 of FIG. 10A. As shown, in one embodiment, the slip component 80 may be comprised of a plurality of jelly rolled charges 60 aligned in series in a circular formation. As will be described later, the rolled charges 60 may be aligned next to each other and compressed in a compression molding press so that the charges 60 mix and cure to form a homogenous cylindrical form. More or fewer of the charges 60 can be used. Additionally, the interior and/or exterior of the slip component 80 or any portion of the cylindrical shape can be formed using a continuous fiber winding method. Thus, a portion the inside surface 81 and/or the outside surface of the component 80 may include wound fiber. The charges 60 are shown oriented parallel to the central axis of the component 80. Other orientations as disclosed herein could be used. For example, the charges could be orientated radially outward from the central axis and may be stacked in series along the length of the component.

FIG. 10C illustrates a perspective view of the slip component 80 of FIG. 10A. As seen in this view, the slip component 80 may be machined after the component 80 has been molded to include insert holes 86 and slits 84. Further, although not visible, the compressed and molded charges 60 extend within the slip component 80 parallel to the reference axis C.

Figure 11A:
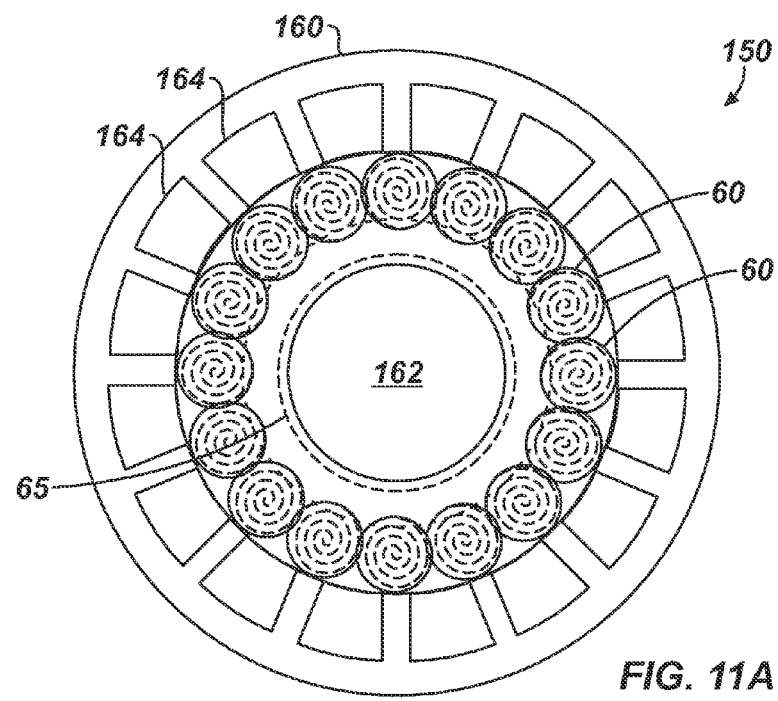
FIGS. 11A-11B conceptually illustrate plan and side views of an initial compression molding stage of the cylindrical slip component of FIG. 10A.
Figure 11B:
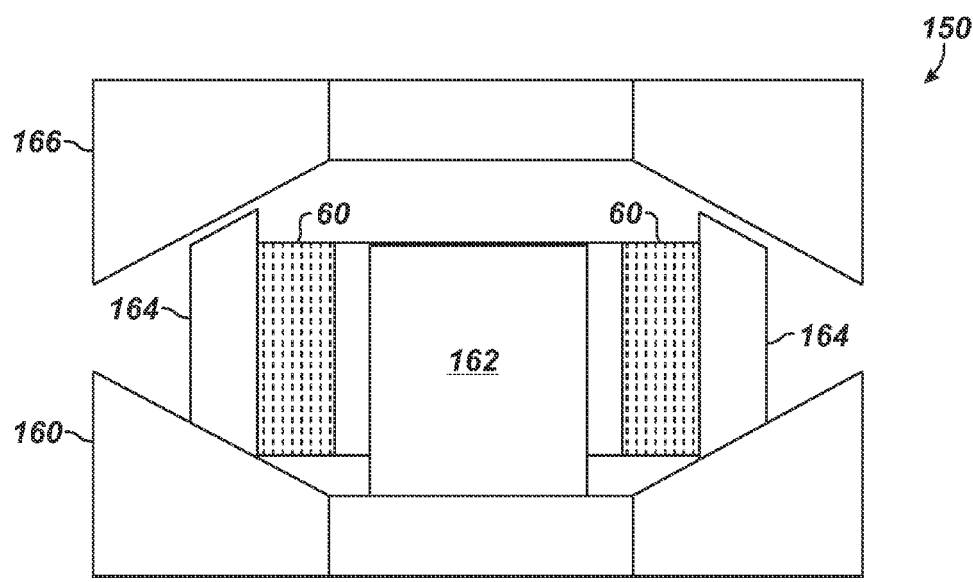

FIGS. 11A-11B conceptually illustrate plan and side views of an initial compression molding stage of the slip component 80 of FIG. 10A. In this view, a compression molding press 150 is configured with rams 164 disposed around a plurality of jelly roll charges 60. Further, the press 150 has in its center a mold core 162. The mold core 162 may be cylindrical, and is typically in a fixed position.

Referring now to the side view of FIG. 11B, the jelly roll charges 60 can be seen between the rams 164 and mold core 162. Also, a movable platen 166 is located at the top of the press 150 and a fixed base platen 160 is located at the bottom of the press 150.

In operation, the jelly roll charges 60 are disposed around the mold core 162 and between the rams 164 and the mold core 162. When the press 150 is engaged, the rams 164 will compress inward toward the mold core 162 while the movable platen 166 is compressed downward toward the fixed base platen 160. In this manner, the jelly roll charges 60 will be compressed into the cylindrical-shaped slip component 80 that can be later be machined to include slits 84 and/or insert holes 86 and the like.

Figure 12A:
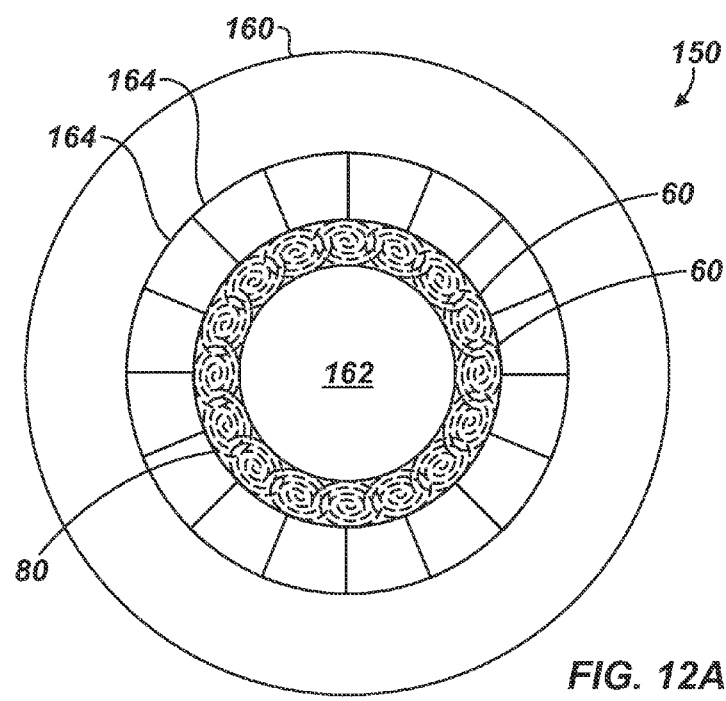
FIGS. 12A-12B conceptually illustrate plan and side views of a subsequent compression molding stage of the cylindrical slip component of FIG. 10A.
Figure 12B:
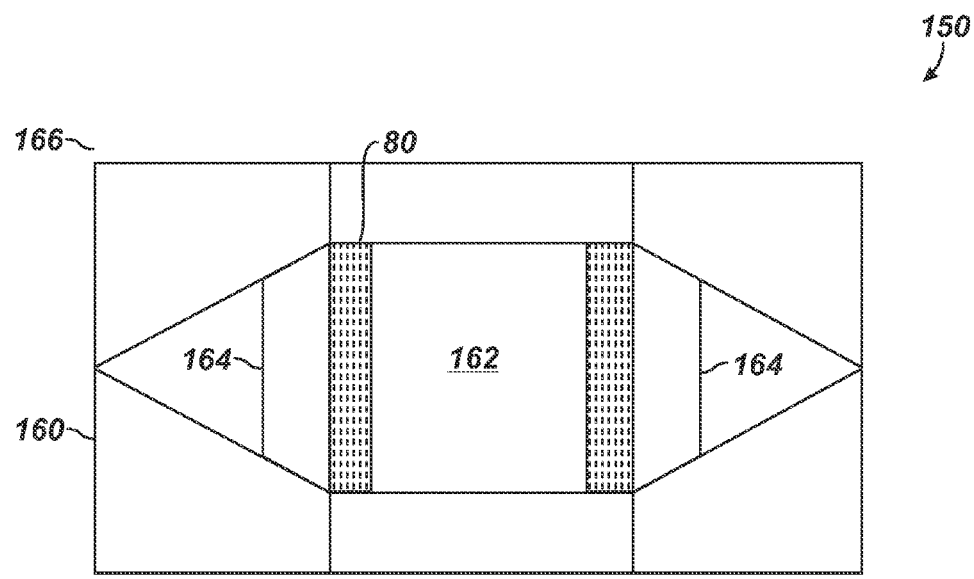

The completion of the molding process described in reference to FIGS. 11A-11B can be further shown in FIGS. 12A-12B. Conceptually, FIGS. 11A-11B illustrate plan and side views of a subsequent compression molding stage of the slip component 80 of FIG. 10A. As shown in FIG. 12A, the charges 60 for the slip component 80 have been compressed into a cylindrical shape.

As shown, the rams 164 compress the individual jelly roll charges 60 against the fixed mold core 162. As a result, the jelly roll charges 60 being aligned next to each other mix and cure to form a homogenous cylindrical form. As further shown in FIG. 10B, the movable platen 166 is fully compressed downward toward the fixed base platen 160, molding the top and bottom of the cylindrical body of the slip component 80.

Due to the orientation of the jelly roll charges 60, the compound layers within the slip component 80 are oriented perpendicular to the width W of the slip component 80. However, as described in detail above, the jelly roll charges 60 may have many different orientations before being molded and cured. Additionally, as noted above, the interior and/or exterior of the slip component 80 can be formed using a continuous fiber winding method. Thus, as shown in FIG. 11A, for example, a cylindrical charge 65 of wound fiber composite can be disposed on the mold core 162 for the rolled charges 60 to compress against during the compression molding process. Additionally, the cured slip component 80 formed from the charges 60 can be finished around its exterior using a continuous fiber winding method.

Figure 13A:
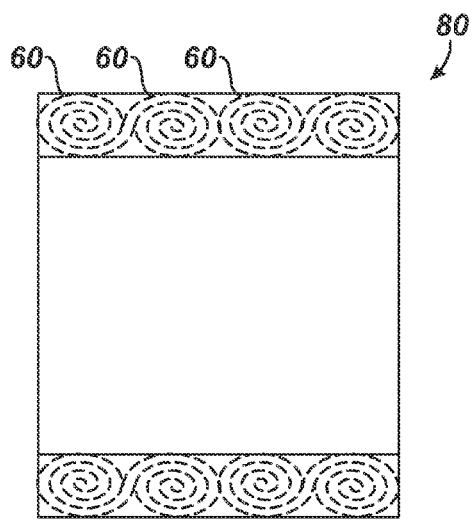
FIGS. 13A-13B conceptually illustrate another interior arrangement of a cylindrical slip component.
Figure 13B:
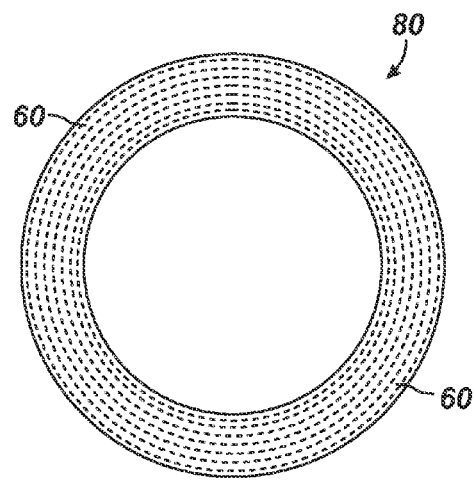

In the previous arrangement, the compound layers within the slip component 80 are oriented parallel to the centerline C of the slip component 80 (i.e., perpendicular to the width W or thickness of the slip component 80). Other configurations are also possible. For example, FIGS. 13A-13B conceptually illustrate another interior arrangement of a cylindrical slip component 80 in which the charges 60 are oriented circumferentially about the cylindrical shape of the component 80. To do this, charges 60 formed as multiple rings and/or ring segments are stacked on top of one another around the cylindrical forge 162, as shown in FIGS. 14A-14B. The stacking can be nested, uniform, or the like.

Figure 15A:
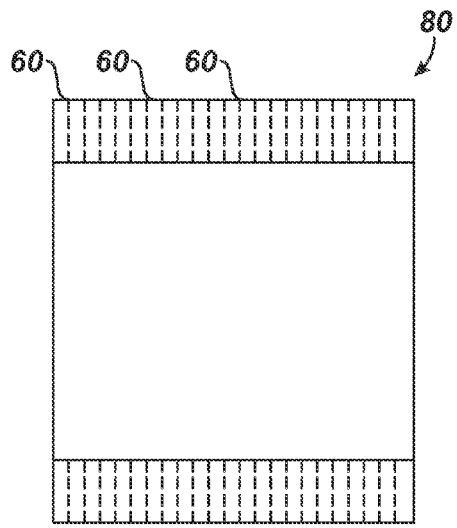
FIGS. 15A-15B conceptually illustrate yet another interior arrangement of a cylindrical slip component.
Figure 15B:
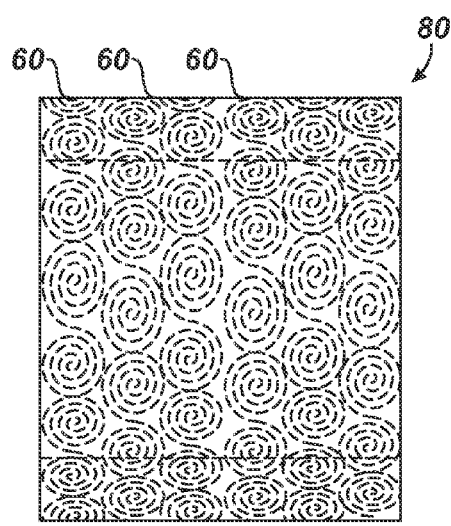

FIGS. 15A-15B conceptually illustrate yet another interior arrangement of a cylindrical slip component 80 in which the charges are orientated radially about the cylindrical shape of the component 80. To do this, charges 60 formed as short rolls are stacked on top of one another around the cylindrical forge 162 with the axis of the charges 60 pointing radially outward, as shown in FIGS. 16A-16B. Again, the stacking can be nested, uniform, or the like.

As the arrangements in FIGS. 10A through 16B indicate, the cylindrical slip component 80 of the present disclosure can have the axes of the charges 60 oriented along the central axis C of the component 80, extending radially outward from the central axis C, or encircling circumferentially the central axis C. A cylindrical slip component 80 as disclosed here can be further molded using the charges 60 arranged together in any combination of these orientations. As one example shown in FIGS. 17A-17B, one end of the cylindrical slip component 80 can be formed from circumferential charges, a central portion of the component 80 can be formed from parallel charges, and the opposing end can be formed from circumferential charges.

As the arrangements in FIGS. 10A through 16B indicate, the cylindrical slip component 80 can have the charges 60 stacked in layers from end-to-end of the cylindrical body. A cylindrical slip component 80 as disclosed here can be further molded using the charges 60 arranged as inward and outer layers. As but one example shown in FIGS. 18A-18B, the inner layer of the cylindrical slip component 80 can be formed from circumferential charges, a central layer of the component 80 can be formed from parallel charges, and the outer layer can be formed from circumferential charges.

Stacked and layered charges according to the examples above in FIGS. 17A through 18B can also be used in combination with one another to create a cylindrical slip component 80 according to the present disclosure.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:
1. A method of forming a cylindrical body for a slip assembly having a central axis, comprising:
   rolling sheet molding compound into a plurality of rolled charges;
   positioning the rolled charges in a cylindrical arrangement about a central axis in a compression molding press; and
   producing a cylindrical molded element by compression molding the rolled charges in the cylindrical arrangement with the compression molding press.

2. The method of claim 1, wherein the sheet molding compound comprises one or more of: an uncured sheet of molding compound, molding composite, or thermosetting material reinforced with glass fiber; a sheet of glass mat thermoplastic; and a sheet of discontinuous fibers impregnated with a composite matrix.

3. The method of claim 1, wherein rolling the sheet molding compound into the rolled charges comprises rolling the sheet molding compound about axes of the rolled charges.

4. The method of claim 3, wherein positioning the rolled charges about the central axis in the compression molding press comprises positioning the rolled charges with the axes parallel to the central axis.

5. The method of claim 3, wherein positioning the rolled charges about the central axis in the compression molding press comprises positioning the rolled charges with the axes directed radially outward from the central axis.

6. The method of claim 3, wherein positioning the rolled charges about the central axis in the compression molding press comprises positioning the rolled charges with the axes directed circumferentially about the central axis.

7. The method of claim 1, wherein producing the molded element by compressing the rolled charge with the compression molding press further comprises heating one or more of the rolled charge and the compression molding press.

8. The method of claim 1, wherein producing the molded element by compressing the rolled charge with the compression molding press further comprises curing the molded element.

9. The method of claim 8, wherein curing the molded element comprises applying a cure temperature and a cure pressure to the molded element.

10. The method of claim 1, further comprising removing the cylindrical molded element from the compression molding press for use as the cylindrical body for the slip assembly.

11. The method of claim 10, wherein removing the molded element from the compression molding press comprises ejecting the molded element using an ejector pin.

12. The method of claim 10, further comprising machining the molded element into the component of the slip assembly.

13. The method of claim 12, wherein machining the molded element into the component of the slip assembly comprises forming one or more holes at least partially in an exterior surface of the cylindrical body, the method further comprising inserting one or more inserts in the one or more holes.

14. The method of claim 12, wherein machining the molded element into the component of the slip assembly comprises forming one or more slits at least partially in the cylindrical molded element.

15. The method of claim 1, wherein rolling the sheet molding compound into the plurality of rolled charges comprises rolling the sheet molding compound into each of the rolled charges having an axis about which the sheet molding compound is rolled; and wherein positioning each of the rolled charges in the compression molding press comprises positioning each of the rolled charges with the axis oblique to the central axis-.

16. The method of claim 1, wherein positioning the rolled charges about the central axis in the compression molding press comprises positioning the rolled charges with axes of the rolled charges being disposed in more than one orientation relative to the central axis.

17. The method of claim 16, wherein positioning the rolled charges with the axes of the rolled charges being disposed in the more than one orientation relative to the central axis comprises:
orienting a first of the axes of first of the rolled charges at a first of the more than one orientation, the first rolled charges being used for ends of the molded element; and
orienting a second of the axes of second of the rolled charges at a second of the one or more orientations different from the first orientation, the second rolled charges being used on the molded element between the ends.

18. The method of claim 16, wherein positioning the rolled charges with the axes disposed in the more than one orientation relative to the central axis comprises:
orienting a first of the axes of first of the rolled charges at a first of the more than one orientation, the first rolled charges being used for at least one of an interior and an exterior of the molded element; and
orienting a second of the axes of second of the rolled charges at a second of the one or more orientations different from the first orientation, the second of the rolled charges being used on the molded element between the interior and the exterior of the molded element.

19. The method of claim 1, further comprising forming a portion of the cylindrical molded element with a continuous fiber winding.

20. The method of claim 1, wherein positioning the rolled charges in the cylindrical arrangement about the central axis in the compression molding press comprises positioning the rolled charges about a core disposed in a center of the compression molding press.

21. The method of claim 20, wherein compression molding the rolled charges in the cylindrical arrangement with the compression molding press comprises pushing, radially inward toward the core, a plurality of rams disposed circumferentially about the rolled charges positioned about the core.

* * * * *